United States Patent
Tokunaga et al.

(10) Patent No.: US 10,598,286 B2
(45) Date of Patent: Mar. 24, 2020

(54) SLIDE COMPONENT

(71) Applicant: EAGLE INDUSTRY CO., LTD., Minato-ku, Tokyo (JP)

(72) Inventors: Yuichiro Tokunaga, Tokyo (JP); Hideyuki Inoue, Tokyo (JP); Wataru Kimura, Tokyo (JP); Tetsuya Iguchi, Tokyo (JP); Takeshi Hosoe, Tokyo (JP); Hidetoshi Kasahara, Tokyo (JP); Takafumi Ota, Tokyo (JP); Keiichi Chiba, Tokyo (JP); Masatoshi Itadani, Tokyo (JP); Hikaru Katori, Tokyo (JP)

(73) Assignee: EAGLE INDUSTRY CO., LTD., Tokyo (JP)

(*) Notice: Subject to any disclaimer, the term of this patent is extended or adjusted under 35 U.S.C. 154(b) by 29 days.

(21) Appl. No.: 15/573,113

(22) PCT Filed: May 13, 2016

(86) PCT No.: PCT/JP2016/064241
§ 371 (c)(1),
(2) Date: Nov. 9, 2017

(87) PCT Pub. No.: WO2016/186019
PCT Pub. Date: Nov. 24, 2016

(65) Prior Publication Data
US 2018/0128377 A1 May 10, 2018

(30) Foreign Application Priority Data
May 19, 2015 (JP) .................................. 2015-101521

(51) Int. Cl.
*F16J 15/34* (2006.01)
*F02B 39/00* (2006.01)
(Continued)

(52) U.S. Cl.
CPC ............. *F16J 15/342* (2013.01); *F02B 39/00* (2013.01); *F16J 15/08* (2013.01); *F16J 15/34* (2013.01); *F16J 15/40* (2013.01)

(58) Field of Classification Search
CPC .. F16J 15/342; F16J 15/08; F16J 15/34; F16J 15/40
See application file for complete search history.

(56) References Cited

U.S. PATENT DOCUMENTS 3,410,565 A * 11/1968 Williams ............... F16J 15/342
277/348
3,695,789 A * 10/1972 Jansson ................. F01C 21/003
277/361

(Continued)

FOREIGN PATENT DOCUMENTS

JP    S6231775 A    2/1987
JP    S62117360 U   7/1987
(Continued)

OTHER PUBLICATIONS

International Search Report (ISR) dated Jul. 5, 2016, issued for International application No. PCT/JP2016/064241.

*Primary Examiner* — Eugene G Byrd
(74) *Attorney, Agent, or Firm* — Law Office of Katsuhiro Arai

(57) ABSTRACT

In an embodiments, in a sealing face of at least one slide part of a pair of slide parts, a dynamic pressure generation groove 10 is provided so as to be separated not to communicate with a sealed fluid side and a leakage side by land portions on both sealing faces, between an end 10a on the leakage side of the dynamic pressure generation groove 10 and the leakage side, a fluid introduction groove 11 which communicates the dynamic pressure generation groove 10 and the leakage side is provided, and the cross-sectional area of the fluid introduction groove 11 is set smaller than the cross- (Continued)

sectional area of the dynamic pressure generation groove 10. The sealing faces are subjected to fluid lubrication and low friction in a steady operation, and leakage of the sealed fluid and entrance of dust into the sealing faces are suppressed.

20 Claims, 6 Drawing Sheets

(51) Int. Cl.
*F16J 15/08* (2006.01)
*F16J 15/40* (2006.01)

(56) References Cited

U.S. PATENT DOCUMENTS

| | | | | |
|---|---|---|---|---|
| 4,406,466 A | * | 9/1983 | Geary, Jr. | F16J 15/3412 277/347 |
| 2004/0232622 A1 | * | 11/2004 | Gozdawa | F16J 15/342 277/401 |
| 2013/0209011 A1 | * | 8/2013 | Tokunaga | F16C 17/045 384/123 |
| 2014/0167362 A1 | * | 6/2014 | Hosoe | F16J 15/3412 277/400 |
| 2015/0240950 A1 | | 8/2015 | Takahashi | |
| 2018/0128378 A1 | * | 5/2018 | Tokunaga | F02B 39/00 |

FOREIGN PATENT DOCUMENTS

| | | | | |
|---|---|---|---|---|
| JP | 2001012610 A | | 1/2001 | |
| JP | WO2014061543 A1 | | 9/2016 | |
| WO | WO-2014103631 A1 | * | 7/2014 | F16J 15/3412 |

\* cited by examiner

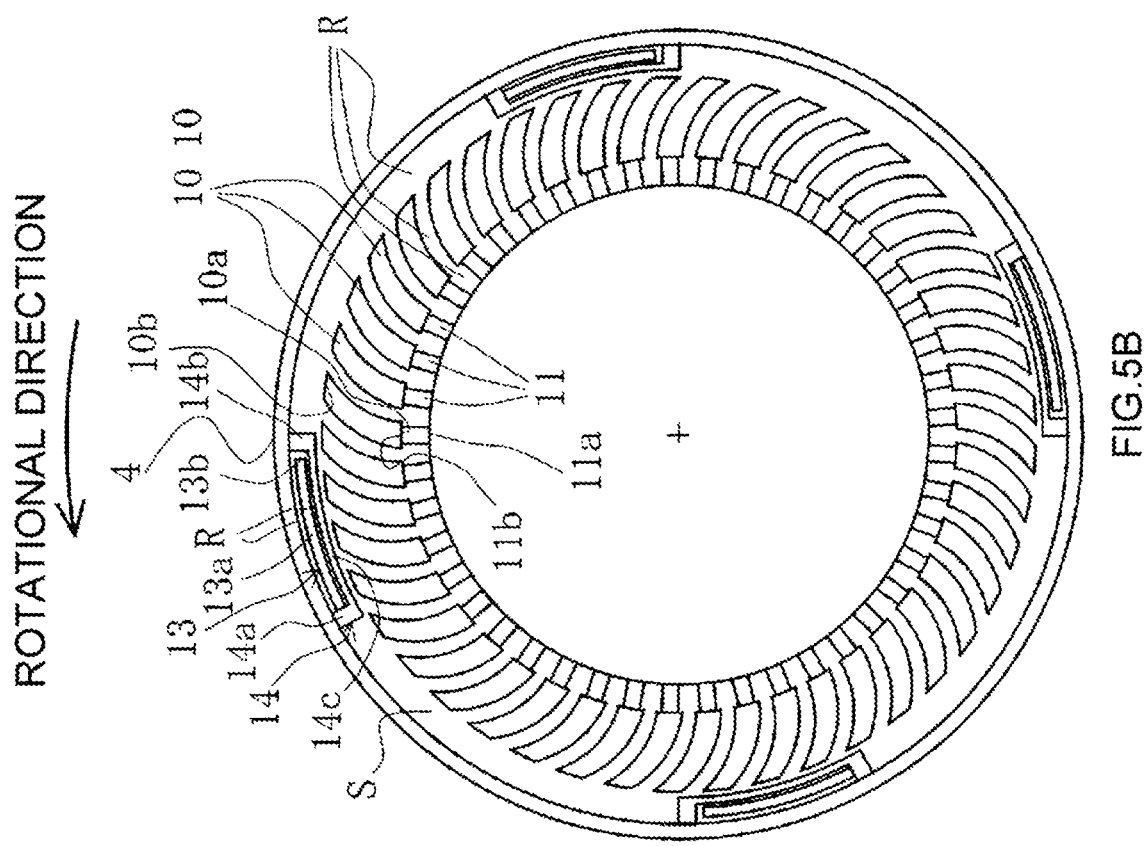
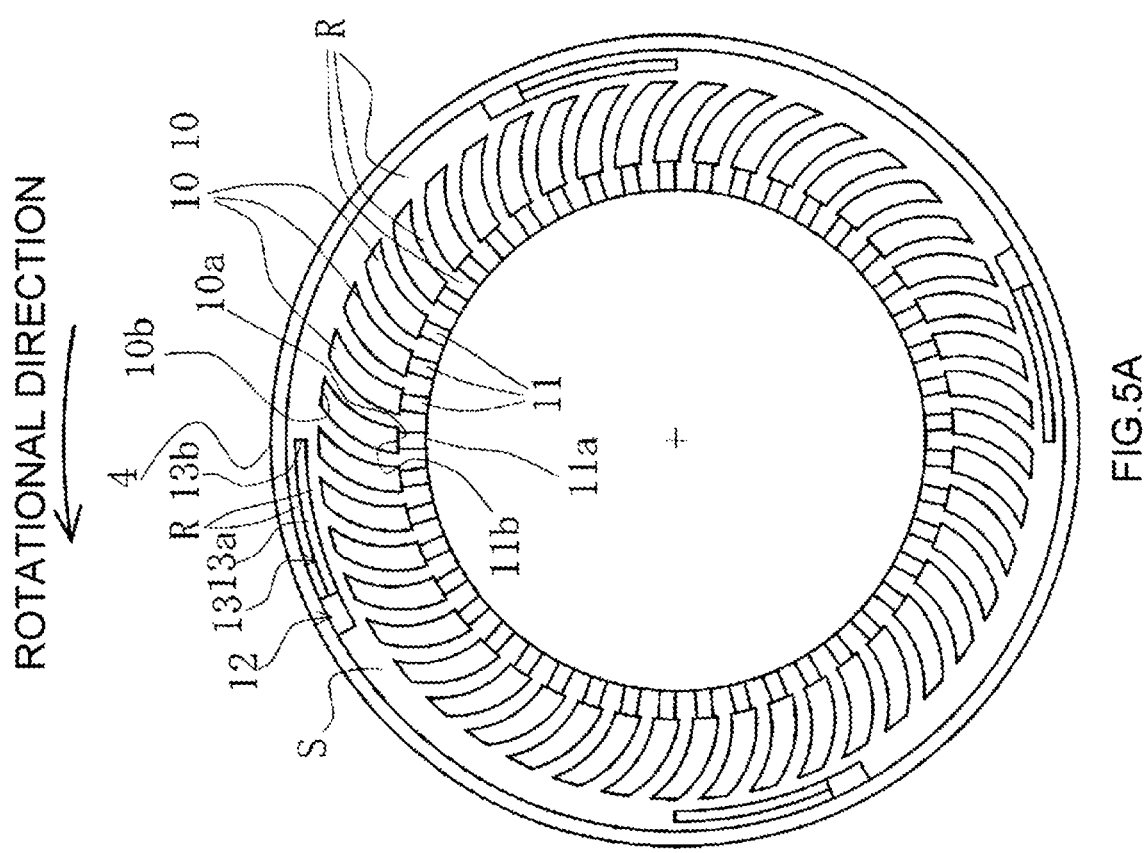

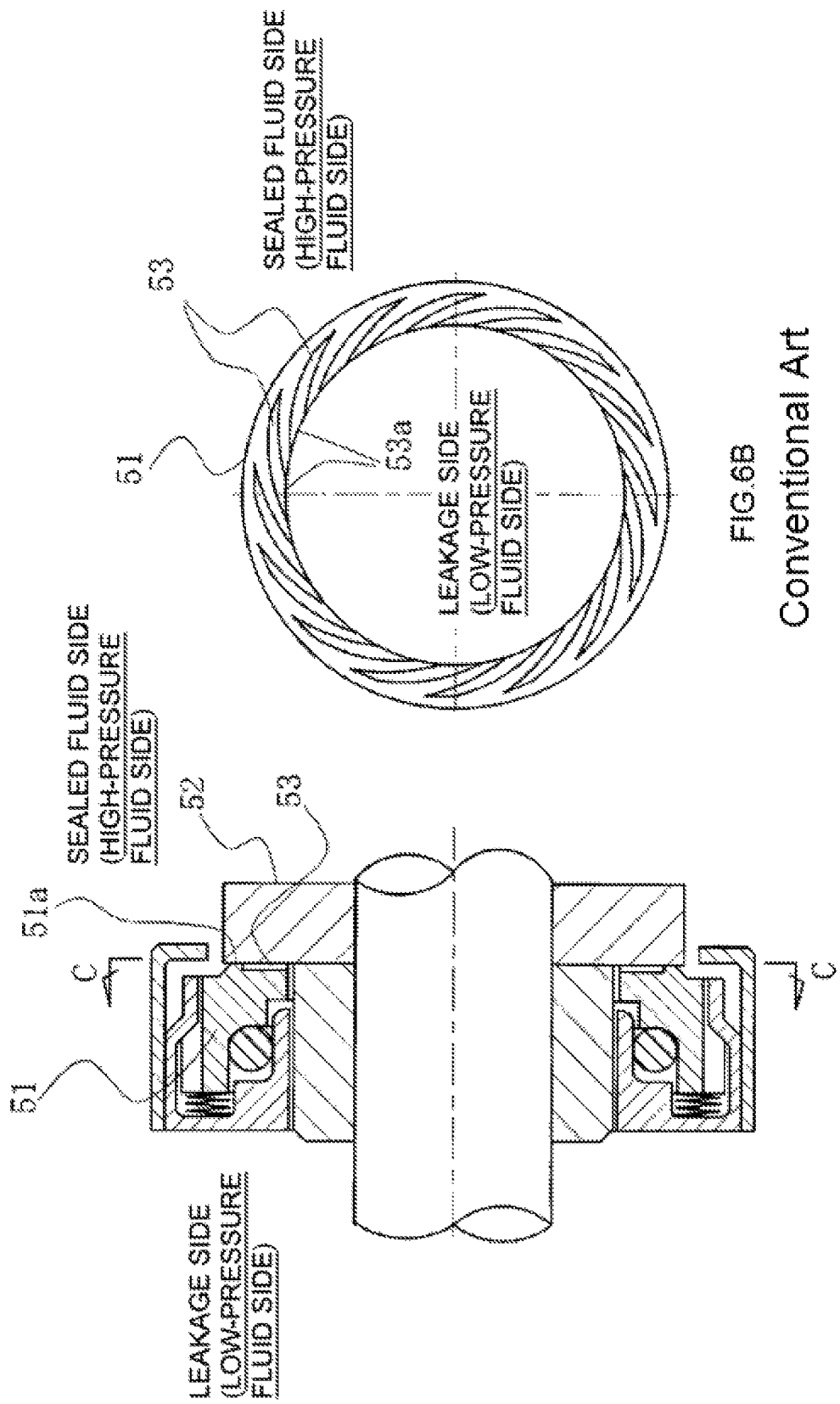

ID COMPONENT

This application is the U.S. National Phase under 35 U.S.C. § 371 of International Application PCT/JP2016/064241, filed May 13, 2016, which claims priority to Japanese Patent Application No. 2015-101521, filed May 19, 2015. The International Application was published under PCT Article 21(2) in a language other than English.

TECHNICAL FIELD

The present invention relates to slide components suitable for, for example, mechanical seals, bearings, and other slide units. In particular, the present invention relates to slide components such as seal rings, for example, oil seals used for gear boxes for turbochargers or aircraft engines, or bearings required to reduce friction by interposing a fluid between sealing faces and to prevent leakage of the fluid from the sealing faces.

BACKGROUND ART

A mechanical seal which is an example of a slide component is evaluated for its performance by a leakage rate, a wear rate, and a torque. In the conventional arts, by optimizing the seal material and the sliding face roughness of mechanical seals, their performance is increased to achieve low leakage, long life, and low torque. However, due to growing awareness of environmental problems in recent years, a further improvement in the performance of mechanical seals has been demanded, for which technology development beyond the limits of the conventional arts has been required.

In that context, for example, as those used for oil seal devices for rotating components such as turbochargers, those including a rotating shaft rotatably received in a housing, a disk-shaped rotor rotating together with the rotating shaft, and a stationary body fixed to the housing and abutting an end face of the rotor for preventing an oil from leaking from the outer peripheral side to the inner peripheral side, in which an annular groove which generates positive pressure by a centrifugal force of fluid is provided in the abutting surface of the stationary body so as to prevent the oil from leaking from the outer peripheral side to the inner peripheral side are known (see Patent Document 1, for example).

Moreover, for example, in shaft seal devices of the rotating shaft which seal toxic fluid, those including a rotating ring, and a stationary ring mounted to a casing, together with the rotating shaft, in which a spiral groove which entrains a liquid on a low-pressure side toward a high-pressure side by the rotation of the rotating ring is provided in the sealing face of either the rotating ring or the stationary ring such that an end on the high-pressure side is formed in a dead-end shape so as to prevent a sealed fluid on the high-pressure side from leaking to the low-pressure side are known (see Patent Document 2, for example).

Moreover, for example, as face seal structures suitable for sealing a drive shaft of the turbocharger with respect to a compressor housing, those in which, of a pair of cooperating seal rings, one is provided as a rotating component and the other is provided as a stationary component, these seal rings have seal surfaces formed substantially radially, a seal gap for sealing zones provided outward of the seal surfaces against zones provided inward of the seal surfaces in operation is formed between the seal surfaces, a plurality of recesses effective for feeding gas and circumferentially spaced from one another are provided in at least one of the seal surfaces, the recesses are extended from one peripheral edge toward the other peripheral edge of the seal surface and inner ends of the recesses are provided to be radially spaced from the other peripheral edge of the seal surface, and thus a non-gas component in a gas medium containing the non-gas component is sealed are known (see Patent Document 3, for example).

CITATION LIST

Patent Document

Patent Document 1: JP 62-117360 U
Patent Document 2: JP 62-31775 A
Patent Document 3: JP 2001-12610 A

SUMMARY OF THE INVENTION

Problem to be Solved by the Invention

However, in the conventional art described in the above Patent Documents 1 to 3, for example, as shown in FIGS. 6A and 6B, there was a problem in that an end 53a on a low-pressure fluid side (hereinafter referred to as a leakage side) of a spiral groove 53 which entrains a fluid on the leakage side toward a sealed fluid side (high-pressure fluid side) by the rotation of a rotating ring 52 in a sealing face 51a of a stationary ring 51 directly opens to the leakage side, therefore dust easily enter from the leakage side.

The present invention has an object to provide a slide component capable of improving both conflicting functions of sealing and lubrication of sealing faces of a pair of slide parts relatively sliding on each other by subjecting the sealing faces to fluid lubrication and low friction in a steady operation and preventing leakage of a sealed fluid and entrance of dust into the sealing faces.

Means for Solving Problem

In order to achieve the above object, in a first aspect, a slide component of the present invention is characterized by including a pair of slide parts relatively sliding on each other, and in that one slide part is a stationary-side seal ring and the other slide part is a rotating-side seal ring, these seal rings have sealing faces formed radially for sealing a sealed fluid from leaking, in the sealing face of at least one slide part of the pair of slide parts, a dynamic pressure generation groove is provided so as to be separated not to communicate with a sealed fluid side and a leakage side by land portions on both sealing faces, between an end on the leakage side of the dynamic pressure generation groove and the leakage side, a fluid introduction groove which communicates the dynamic pressure generation groove and the leakage side is provided, and the cross-sectional area of the fluid introduction groove is set smaller than the cross-sectional area of the dynamic pressure generation groove.

According to the first aspect, it is possible to provide the slide component capable of improving both conflicting functions of sealing and lubrication of the sealing faces by subjecting the sealing faces to fluid lubrication and low friction in a steady operation and preventing entrance of dust coexisting in the fluid on the leakage side into the sealing faces. Moreover, since the dynamic pressure generation groove is separated from the sealed fluid side by the land portions, leakage does not occur even at a standstill.

Moreover, in a second aspect, a slide component of the present invention is characterized by including a pair of slide parts relatively sliding on each other, and in that one slide part is a stationary-side seal ring and the other slide part is a rotating-side seal ring, these seal rings have sealing faces formed radially for sealing a liquid or a mist-like fluid which is a sealed fluid from leaking, in the sealing face of at least one slide part of the pair of slide parts, a dynamic pressure generation groove is provided so as to be separated not to communicate with a sealed fluid side and a leakage side by land portions on both sealing faces, between an end on the leakage side of the dynamic pressure generation groove and the leakage side, a fluid introduction groove which communicates the dynamic pressure generation groove and the leakage side is provided, and the cross-sectional area of the fluid introduction groove is set smaller than the cross-sectional area of the dynamic pressure generation groove.

According to the second aspect, it is possible to provide the slide component capable of improving both conflicting functions of sealing and lubrication of the sealing faces by subjecting the sealing faces to fluid lubrication and low friction in a steady operation and preventing leakage of a liquid which is a sealed fluid and entrance of dust existing in the fluid on the leakage side into the sealing faces. Moreover, since the dynamic pressure generation groove is separated from the side of the liquid which is the sealed fluid by the land portions, leakage does not occur even at a standstill.

Moreover, in a third aspect, the slide component according to the first or second aspect of the present invention is characterized in that the dynamic pressure generation groove has a spiral shape for sucking the fluid on the leakage side and pumping it to the sealed fluid side.

According to the third aspect, the fluid on the leakage side is pumped toward the sealed fluid side in a steady operation, and the sealed fluid is prevented from leaking to the leakage side.

Moreover, in a fourth aspect, the slide component according to any of the first to third aspects of the present invention is characterized in that the fluid introduction groove is set such that the cross-sectional area thereof decreases from the leakage side toward the dynamic pressure generation groove side.

According to the fourth aspect, entrance of dust existing in the fluid on the leakage side into the sealing faces can be further prevented.

Moreover, in a fifth aspect, the slide component according to any of the first to fourth aspects of the present invention is characterized in that the fluid introduction groove is arranged to be inclined upstream from the leakage side toward the dynamic pressure generation groove side.

According to the fifth aspect, entrance of dust existing in the fluid on the leakage side into the sealing faces can be further prevented.

Moreover, in a sixth aspect, the slide component according to any of the first to fifth aspects of the present invention is characterized in that, the fluid introduction groove has a cross-sectional shape, which presents wavy smooth curves at a bottom wall and side walls of the fluid introduction groove.

According to the sixth aspect, dust existing in the fluid on the leakage side hardly settles on the end on the leakage side of the fluid introduction groove. Moreover, while introduction of the fluid can be facilitated, the opening space can be narrowed, and entrance of dust into the fluid introduction groove can be prevented. Further, since the side walls are connected to an opening by wavy smooth curves, aggressiveness of the opening against the sealing face on the opposite side can be reduced.

Moreover, in a seventh aspect, the slide component according to any of the first to sixth aspects of the present invention is characterized in that, in the sealing face of at least one slide part of the pair of slide parts, a fluid introduction groove configured so as to communicate with the sealed fluid side and not to communicate with the leakage side is provided.

According to the seventh aspect, the liquid existing on the outer peripheral side of the sealing face in the low speed rotation state of the rotating-side seal ring such as at star-up is actively introduced into the sealing face, and it is possible to lubricate the sealing face.

Moreover, since the liquid introduced into the sealing face from the fluid introduction groove in the high speed rotation such as a steady operation of the rotating-side seal ring is discharged by a centrifugal force, the liquid does not leak to the inner peripheral side which is the leakage side.

Effect of the Invention

The present invention exhibits the following superior effects.

(1) The slide component includes a pair of slide parts relatively sliding on each other, one slide part is a stationary-side seal ring and the other slide part is a rotating-side seal ring, these seal rings have sealing faces formed radially for sealing a sealed fluid from leaking, in the sealing face of at least one slide part of the pair of slide parts, a dynamic pressure generation groove is provided so as to be separated not to communicate with a sealed fluid side and a leakage side by land portions on both sealing faces, between an end on the leakage side of the dynamic pressure generation groove and the leakage side, a fluid introduction groove which communicates the dynamic pressure generation groove and the leakage side is provided, and the cross-sectional area of the fluid introduction groove is set smaller than the cross-sectional area of the dynamic pressure generation groove, whereby it is possible to provide the slide component capable of improving both conflicting functions of sealing and lubrication of the sealing faces by subjecting the sealing faces to fluid lubrication and low friction in a steady operation and preventing entrance of dust coexisting in the fluid on the leakage side into the sealing faces. Moreover, since the dynamic pressure generation groove is separated from the sealed fluid side by the land portions, leakage does not occur even at a standstill.

(2) The slide component includes a pair of slide parts relatively sliding on each other, one slide part is a stationary-side seal ring and the other slide part is a rotating-side seal ring, these seal rings have sealing faces formed radially for sealing a liquid or a mist-like fluid which is a sealed fluid from leaking, in the sealing face of at least one slide part of the pair of slide parts, a dynamic pressure generation groove is provided so as to be separated not to communicate with a sealed fluid side and a leakage side by land portions on both sealing faces, between an end on the leakage side of the dynamic pressure generation groove and the leakage side, a fluid introduction groove which communicates the dynamic pressure generation groove and the leakage side is provided, and the cross-sectional area of the fluid introduction groove is set smaller than the cross-sectional area of the dynamic pressure generation groove, whereby it is possible to provide the slide component capable of improving both conflicting functions of sealing and lubrication of the sealing faces by subjecting the sealing faces to fluid lubrication and low friction in a steady operation and preventing leakage of a liquid which is a sealed fluid and entrance of dust existing in the fluid on the leakage side into the sealing faces. Moreover, since the dynamic pressure generation groove is separated from the side of the liquid which is the sealed fluid by the land portions, leakage does not occur even at a standstill.

(3) The dynamic pressure generation groove has a spiral shape for sucking the fluid on the leakage side and pumping it to the sealed fluid side, whereby the fluid on the leakage side is pumped toward the sealed fluid side in a steady operation, and the sealed fluid is prevented from leaking to the leakage side.

(4) The fluid introduction groove is set such that the cross-sectional area thereof decreases from the leakage side toward the dynamic pressure generation groove side, whereby entrance of dust existing in the fluid on the leakage side into the sealing faces can be further prevented.

(5) The fluid introduction groove is arranged to be inclined upstream from the leakage side toward the dynamic pressure generation groove side, whereby entrance of dust existing in the fluid on the leakage side into the sealing faces can be further prevented.

(6) The fluid introduction groove has a cross-sectional shape, which presents wavy smooth curves at a bottom wall and side walls of the fluid introduction groove, whereby dust existing in the fluid on the leakage side hardly settles on the end on the leakage side of the fluid introduction groove. Moreover, while introduction of the fluid can be facilitated, the opening space can be narrowed, and entrance of dust into the fluid introduction groove can be prevented. Further, since the side walls are connected to an opening by wavy smooth curves, aggressiveness of the opening against the sealing face on the opposite side can be reduced.

(7) In the sealing face of at least one slide part of the pair of slide parts, a fluid introduction groove configured so as to communicate with the sealed fluid side and not to communicate with the leakage side is provided, whereby the liquid existing on the outer peripheral side of the sealing face in the low speed rotation state of the rotating-side seal ring such as at start-up is actively introduced into the sealing face, and it is possible to lubricate the sealing face.

Moreover, since the liquid introduced into the sealing face from the fluid introduction groove in the high speed rotation such as a steady operation of the rotating-side seal ring is discharged by a centrifugal force, the liquid does not leak to the inner peripheral side which is the leakage side.

BRIEF DESCRIPTION OF THE DRAWINGS

FIGS. 5A and 5B each show a sealing face of one slide part of a slide component according to a second embodiment of the present invention described (FIGS. 5A and 5B are different in the shape of a fluid introduction groove).

FIGS. 6A and 6B each are an explanatory drawing for explaining a conventional art, and FIG. 6A is a vertical cross-sectional view and FIG. 6B is a cross-sectional view taken along arrow C-C.

DESCRIPTION OF EMBODIMENTS

Hereinafter with reference to the drawings, embodiments for implementing this invention will be described illustratively based on implementation examples. However, the dimensions, materials, shapes, relative arrangements, and others of components described in the embodiments are not intended to limit the scope of the present invention only to them unless otherwise described explicitly.

First Embodiment

With reference to FIG. 1 to FIG. 4, a slide component according to a first embodiment of the present invention will be described.

In the following embodiment, a mechanical seal which is an example of the slide component will be described as an example. Although the outer peripheral side of slide parts constituting the mechanical seal is described as a sealed fluid side (liquid side or mist-like fluid side) and the inner peripheral side is described as a leakage side (gas side), the present invention is not limited to this, and is also applicable to a case where the outer peripheral side is the leakage side (gas side) and the inner peripheral side is the sealed fluid side (liquid side or mist-like fluid side). Moreover, with respect to the magnitude relation between the pressures on the sealed fluid side (liquid side or mist-like fluid side) and the leakage side (gas side), for example, the pressure on the sealed fluid side (liquid side or mist-like fluid side) may be high and the pressure on the leakage side (gas side) may be low, or vice versa, and both pressures may be the same.

Figure 1:
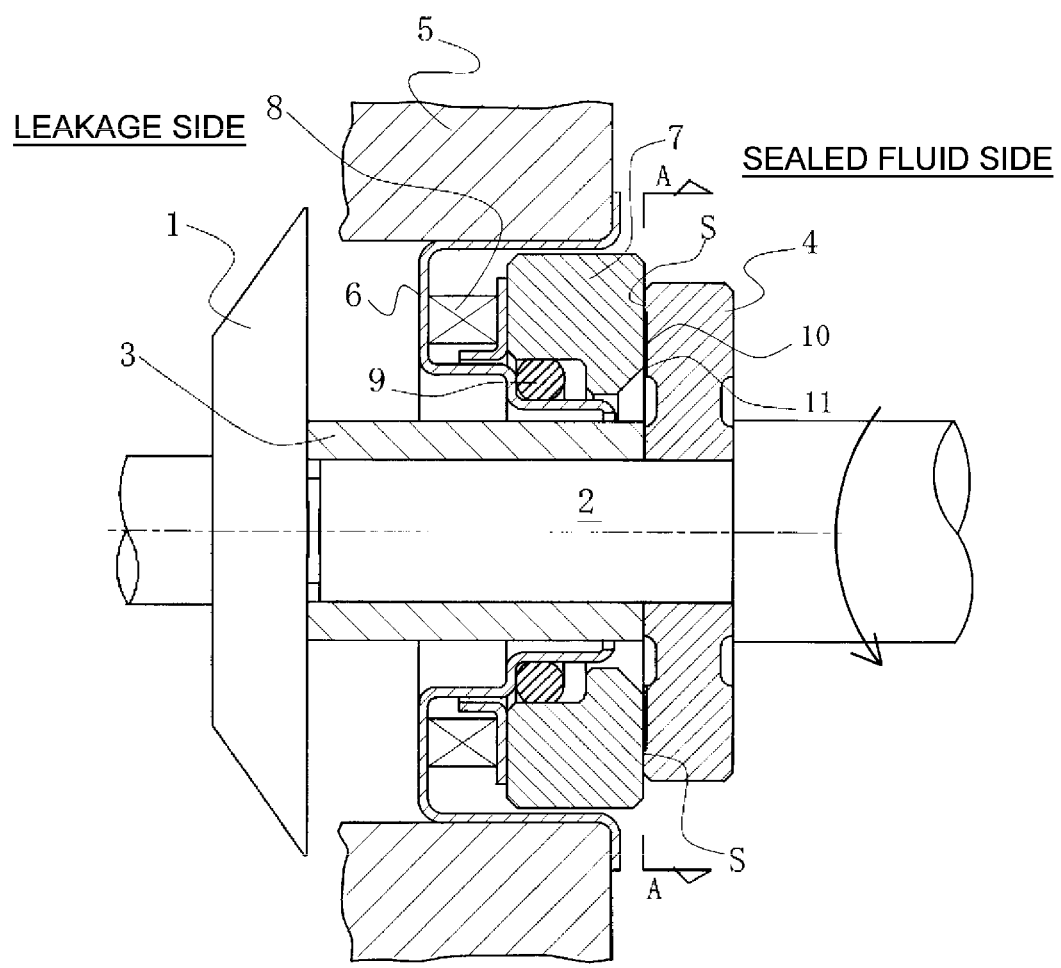
FIG. 1 is a vertical cross-sectional view showing an example of a mechanical seal according to a first embodiment of the present invention.

FIG. 1 is a vertical cross-sectional view showing an example of the mechanical seal, which is an inside mechanical seal in a form of sealing a sealed fluid, for example, a lubricating oil used for a bearing, tending to leak from the outer periphery of sealing faces toward the inner periphery. The mechanical seal is provided, on the side of a rotating shaft 2 to drive an impeller 1 of a compressor included in a turbocharger, with a rotating-side seal ring 4 in an annular shape which is one slide part provided in a state of being rotatable with the rotating shaft 2 in an integrated manner via a sleeve 3, and at a housing 5, with a stationary-side seal ring 7 in an annular shape which is the other slide part provided in a state of being non-rotatable and axially movable via a cartridge 6. By a coiled wave spring 8 axially biasing the stationary-side seal ring 7, the rotating-side seal ring 4 and the stationary-side seal ring 7 slide in close contact with each other on sealing faces S mirror-finished by lapping or the like. That is, in the mechanical seal, the rotating-side seal ring 4 and the stationary-side seal ring 7 have the sealing faces S formed radially, and the mechanical seal prevents a sealed fluid, for example, a liquid or a mist-like fluid (hereinafter, a liquid or a mist-like fluid may be referred to as simply "a liquid"), from flowing out from the outer periphery of the sealing face S to the leakage side on the inner peripheral side at each other's sealing faces S.

In addition, reference numeral 9 indicates an O-ring for sealing between the cartridge 6 and the stationary-side seal ring 7.

In this embodiment, a case where the sleeve 3 and the rotating-side seal ring 4 are separately formed is described, but the present invention is not limited thereto, and the sleeve 3 and the rotating-side seal ring 4 may be integrally formed.

Although the materials of the rotating-side seal ring 4 and the stationary-side seal ring 7 are selected from silicon carbide (SiC) excellent in wear resistance, carbon excellent in self-lubricity and the like, for example, both may be SiC or combinations of SiC as one and carbon as the other are possible.

Figure 2:
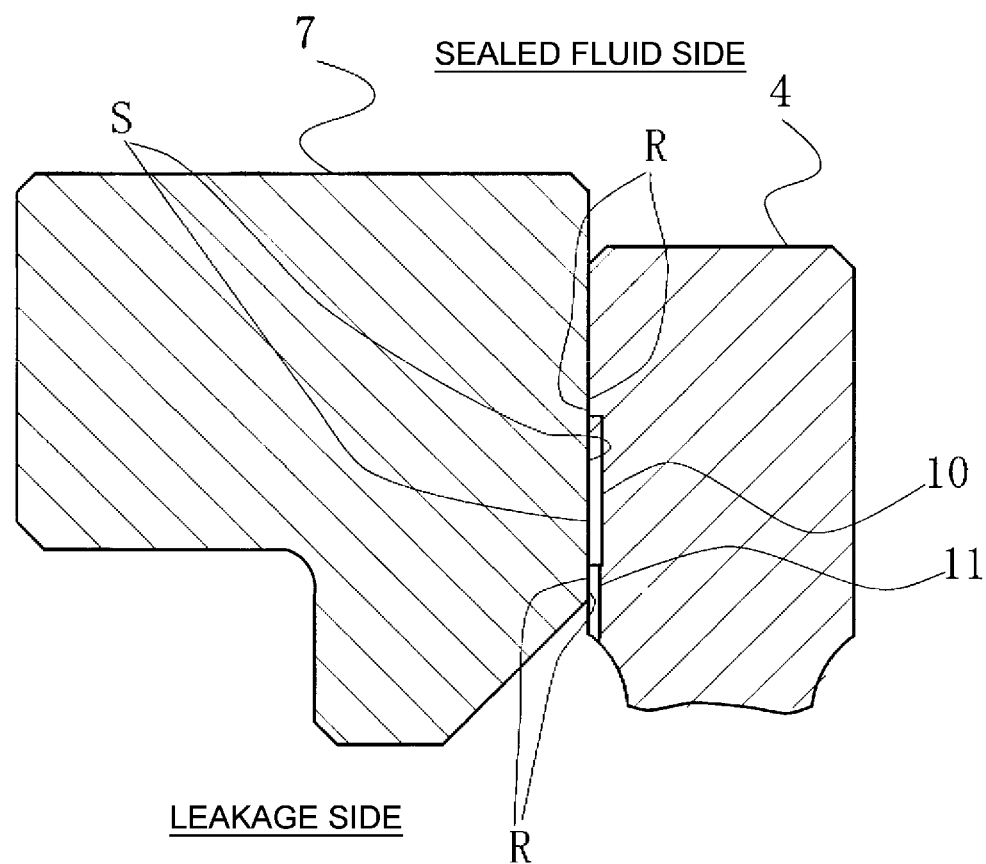
FIG. 2 is an enlarged view showing sealing portions of a slide component according to the first embodiment of the present invention, and its rotation center exists in the horizontal direction on the lower side of the drawing sheet.

FIG. 2 is an enlarged view showing sealing portions of the slide component according to the first embodiment of the present invention.

In FIG. 2, in the sealing face S of the rotating-side seal ring 4, a dynamic pressure generation groove 10 is provided so as to be separated not to communicate with the sealed fluid side and the leakage side by land portions R on the sealing faces of the rotating-side seal ring 4 and the stationary-side seal ring 7. That is, in this embodiment, the dynamic pressure generation groove 10 is provided only in the sealing face S of the rotating-side seal ring 4, the land portions R exist on the leakage side and the sealed fluid side in the radial direction of the dynamic pressure generation groove 10, and the sealing face S of the stationary-side seal ring 7 slides into contact with the land portion R of the rotating-side seal ring 4, thereby separating the dynamic pressure generation groove 10 from the sealed fluid side and the leakage side without communication. Specifically, the outside diameter on the sealed fluid side of the sealing face S of the stationary-side seal ring 7 is set larger in the radial direction than that of an end on the sealed fluid side of the dynamic pressure generation groove 10 of the rotating-side seal ring 4 and the inside diameter on the leakage side of the sealing face S of the stationary-side seal ring 7 is set smaller in the radial direction than that of an end on the leakage side of the dynamic pressure generation groove 10, and the sealing face S of the stationary-side seal ring 7 and the land portions R on the inside diameter side and the outside diameter side of the dynamic pressure generation groove 10 of the rotating-side seal ring 4 slide into contact with each other, whereby the dynamic pressure generation groove 10 is separated from the sealed fluid side and the leakage side without communication.

Figure 3A:
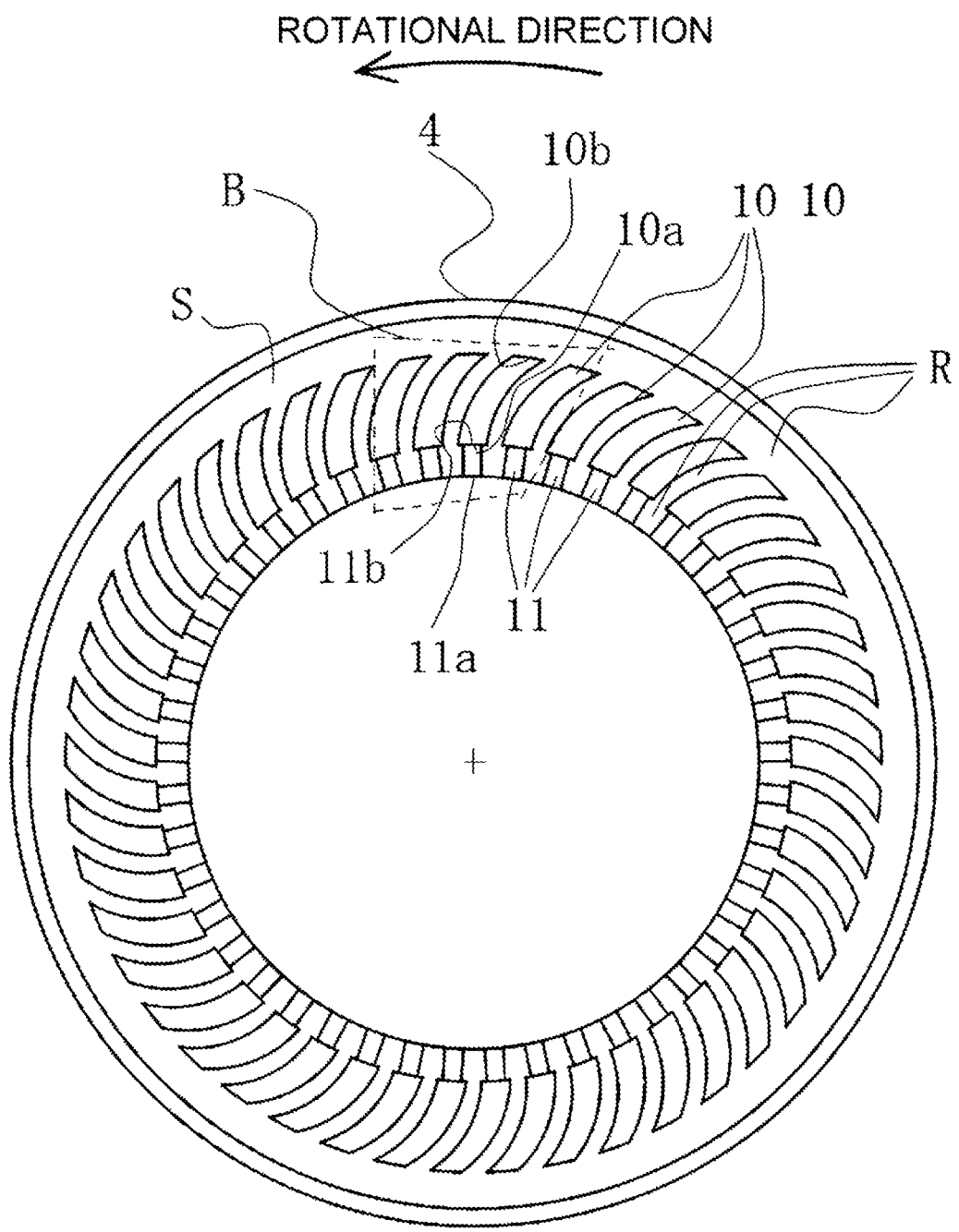
FIG. 3A is a cross-sectional view taken along arrow A-A in FIG. 1, and FIG. 3B and FIG. 3C show modifications of a fluid introduction groove showing a portion corresponding to a portion B in FIG. 3A.

As shown also in FIG. 3, between an end 10a on the leakage side of the dynamic pressure generation groove 10 and the leakage side, a fluid introduction groove 11 which communicates the dynamic pressure generation groove 10 and the leakage side is provided. The cross-sectional area of the fluid introduction groove 11 is set smaller than the cross-sectional area of the dynamic pressure generation groove 10, thereby suppressing entrance of dust coexisting in the fluid on the leakage side.

Figure 4:
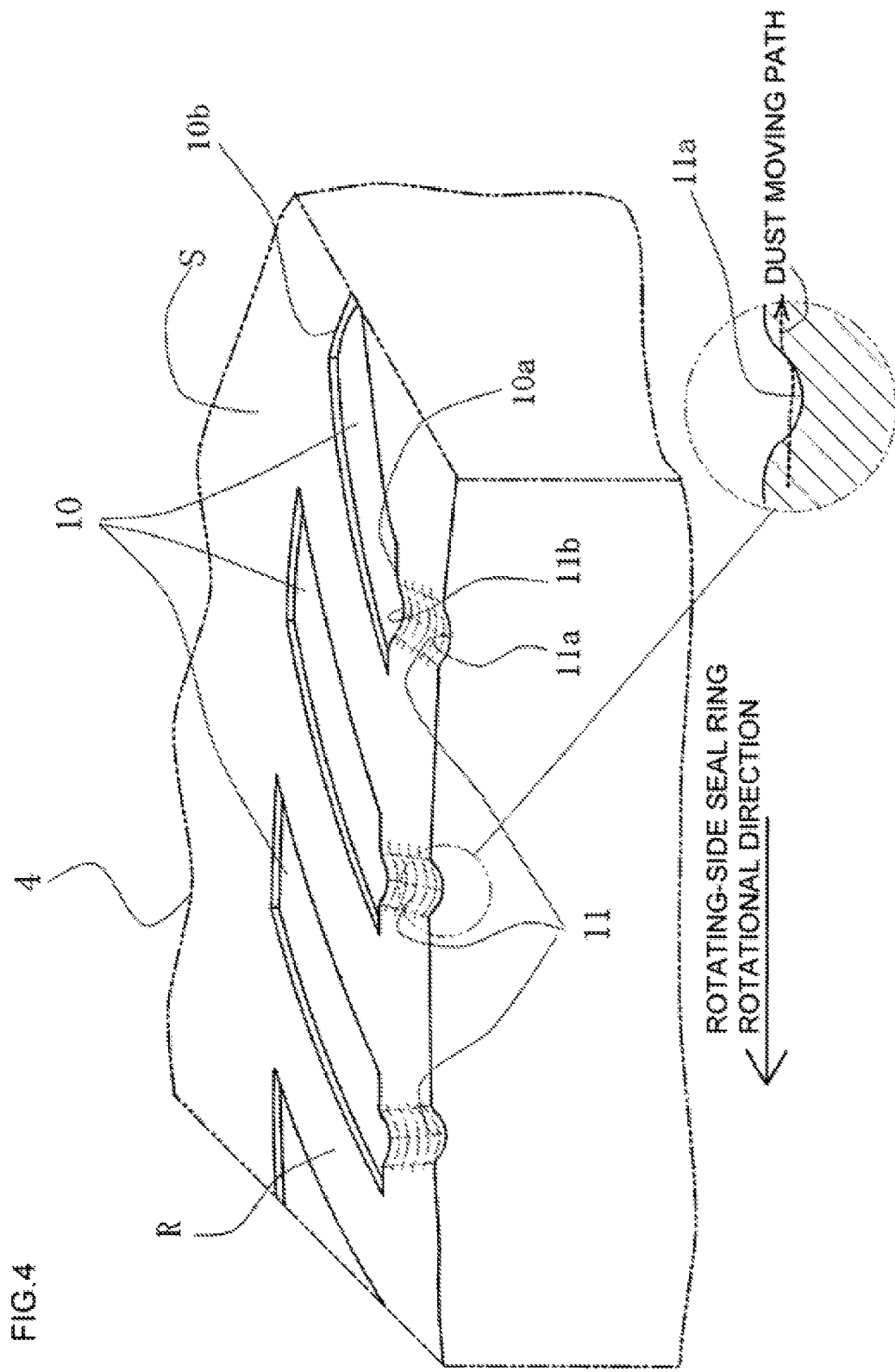
FIG. 4 is a perspective view of a substantial part when a sealing face in FIG. 3 is obliquely viewed.

In this embodiment, the dynamic pressure generation groove 10 has a cross-section, which presents substantially straight lines at a bottom wall and side walls of the groove 10, and the groove 10 is open at the upper side. Moreover, as shown in FIG. 4, the fluid introduction groove 11 has a cross-section, which presents wavy smooth curves at a bottom wall and side walls of the groove 11, and the groove 11 is open at the upper side.

The dynamic pressure generation groove 10 is for sucking the fluid on the leakage side and pumping it to the sealed fluid side and has a spiral shape as shown in FIG. 3, for example.

In the spiral-shaped dynamic pressure generation groove 10, the end 10a on the leakage side is communicated with an end 11b on the dynamic pressure generation groove side of the fluid introduction groove 11 and an end 10b on the sealed fluid side is not communicated with the sealed fluid side, and the dynamic pressure generation groove 10 is inclined into a spiral shape so as to exhibit pumping action from the end 10a on the leakage side toward the end 10b on the sealed fluid side by relative sliding of the rotating-side seal ring 4 and the stationary-side seal ring 7 and generates dynamic pressure (positive pressure).

Although, in FIG. 3, the spiral-shaped dynamic pressure generation groove 10 is uniformly formed in groove width, the groove width of the end 10a on the leakage side communicated with the end 11b on the dynamic pressure generation groove side of the fluid introduction groove 11 may be increased, that is, the circumferential direction length of the end 10a may be lengthened than the other portions, to increase an effect of supplying the fluid into the dynamic pressure generation groove 10.

Since the spiral-shaped dynamic pressure generation groove 10 sucks a gas via the fluid introduction groove 11 from the leakage side and generates dynamic pressure (positive pressure) in the vicinity of the end 10b on the sealed fluid side in the highspeed rotation state of the rotating-side seal ring 4 such as a steady operation, a slight gap is formed between the sealing faces S of the rotating-side seal ring 4 and the stationary-side seal ring 7, and the sealing faces S are brought into a gas lubrication state to have very low friction.

On the other hand, the fluid introduction groove 11, which is for communicating the leakage side and the dynamic pressure generation groove 10, in the present invention, is formed in such a cross-sectional shape that dust coexisting in the fluid on the leakage side does not settle on the fluid introduction groove 11, and further in such a path shape that dust coexisting in the fluid on the leakage side does not enter the dynamic pressure generation groove 10 by way of the fluid introduction groove 11.

Firstly, the fluid introduction groove 11 is not limited to have a cross-sectional shape, which presents the aforementioned wavy smooth curves at the bottom wall and the side walls of the groove 11, and any desired shapes are adoptable. However, as shown in FIG. 4, in a case where the cross-sectional shape presents a wavy shape, it is a smooth curved shape without angles, and therefore dust existing in the fluid on the leakage side hardly settles on the end 11a on the leakage side of the fluid introduction groove 11. Moreover, in a case where the cross-sectional shape presents a wavy shape, while introduction of the fluid can be facilitated, the opening space can be narrowed, and entrance of dust into the fluid introduction groove 11 can be thus prevented. Further, due to a wavy shape, aggressiveness against the sealing face on the opposite side, that is, the sealing face of the stationary-side seal ring 7 can be reduced.

Secondly, in the path shape of the fluid introduction groove 11, in order to prevent dust coexisting in the fluid on the leakage side from entering the dynamic pressure generation groove 10 by way of the fluid introduction groove 11 as much as possible, the cross-sectional shape of the fluid introduction groove 11 is set smaller than the cross-sectional shape of the dynamic pressure generation groove 10 as mentioned above.

Figure 3B:
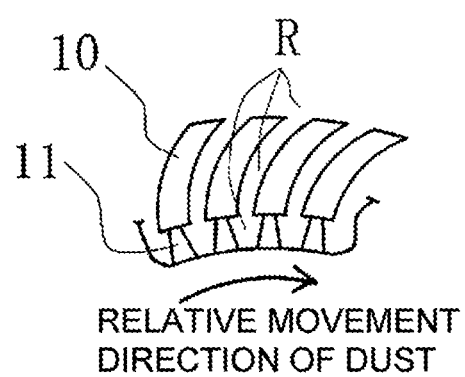

In addition, as shown in FIG. 3B, the fluid introduction groove 11 may be set such that the cross-sectional area thereof gradually decreases from the end 11a on the leakage side toward the end 11b on the side of the dynamic pressure generation groove 10. In that case, the width of the cross-section may be gradually decreased, the depth may be gradually decreased, or both of the width and the depth may be gradually decreased. When the cross-sectional area is set so as to be gradually decreased from the leakage side toward the dynamic pressure generation groove 10, entrance of dust into the fluid introduction groove 11 can be reduced.

Figure 3C:
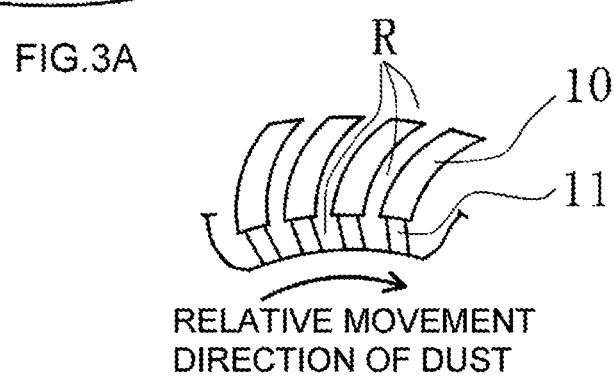

Further, as shown in FIG. 3C, the fluid introduction groove 11 may be arranged to be inclined upstream from the end 11*a* on the leakage side toward the end 11*b* on the side of the dynamic pressure generation groove 10. According to this configuration, entrance of dust from the end 11*a* on the leakage side of the fluid introduction groove 11 toward the end 11*b* on the side of the dynamic pressure generation groove 10 becomes difficult.

According to the configuration described above, the first embodiment exhibits the following effects.

(1) In the sealing face S (the sealing face S of the rotating-side seal ring 4) of at least one slide part of the pair of slide parts, the dynamic pressure generation groove 10 is provided so as to be separated not to communicate with the side of the liquid which is the sealed fluid and the leakage side by the land portions R on both sealing faces S, between the end 10*a* on the leakage side of the dynamic pressure generation groove 10 and the leakage side, the fluid introduction groove 11 which communicates the dynamic pressure generation groove 10 and the leakage side is provided, and the cross-sectional area of the fluid introduction groove 11 is set smaller than the cross-sectional area of the dynamic pressure generation groove 10, whereby it is possible to provide the slide component capable of improving both conflicting functions of sealing and lubrication of the sealing faces by subjecting the sealing faces to fluid lubrication and low friction in a steady operation and preventing leakage of the liquid which is the sealed fluid and entrance of dust existing in the fluid on the leakage side into the sealing faces. Moreover, since the dynamic pressure generation groove is separated from the side of the liquid which is the sealed fluid by the land portions, leakage does not occur even at a standstill.

(2) The dynamic pressure generation groove 10 has a spiral shape for sucking the fluid on the leakage side and pumping it to the side of the liquid which is the sealed fluid, whereby the fluid on the leakage side is pumped toward the side of the liquid which is the sealed fluid in a steady operation, and the liquid which is the sealed fluid is prevented from leaking to the leakage side.

(3) The fluid introduction groove 11 is set such that the cross-sectional area thereof decreases from the end 11*a* on the leakage side toward the end 11*b* on the side of the dynamic pressure generation groove 10, whereby entrance of dust existing in the fluid on the leakage side into the sealing faces can be further prevented.

(4) The fluid introduction groove 11 is arranged to be inclined upstream from the end 11*a* on the leakage side toward the end 11*b* on the side of the dynamic pressure generation groove 10, whereby entrance of dust existing in the fluid on the leakage side into the sealing faces can be further prevented.

(5) The fluid introduction groove 11 has a cross-sectional shape, which presents wave-like smooth curves at a bottom wall and side walls of the groove 11, whereby dust existing in the fluid on the leakage side hardly settles on the end 11*a* on the leakage side of the fluid introduction groove 11. Moreover, while introduction of the fluid can be facilitated, the opening space can be narrowed, and entrance of dust into the fluid introduction groove 11 can be prevented. Further, since the side walls are connected to the opening by wavy smooth curves, aggressiveness of the opening against the sealing face on the opposite side, that is, the sealing face of the stationary-side seal ring 7 can be reduced.

Second Embodiment

With reference to FIGS. 5A and 5B, a slide component according to a second embodiment of the present invention will be described (FIGS. 5A and 5B are different in the shape of a fluid introduction groove).

The slide component according to the second embodiment is different from the first embodiment in that a fluid introduction groove and a positive pressure generation mechanism are provided in the sealing face of at least one slide part of the pair of slide parts, but the other basic configuration is the same as that in the first embodiment, so the same members are denoted by the same numerals and symbols, and redundant descriptions will be omitted.

In FIG. 5A, in the sealing face S of the rotating-side seal ring 4, a fluid introduction groove 12 configured so as to communicate with the sealed fluid side of the sealing face S, that is, the peripheral edge on the outer peripheral side, and not to communicate with the leakage side, that is, the peripheral edge on the inner peripheral side, is provided.

One or more fluid introduction grooves 12 are arranged along the peripheral edge on the outer peripheral side, the planar shape is formed into a substantially rectangular shape, and the fluid introduction grooves 12 are communicated with the sealed fluid side at the peripheral edge on the outer peripheral side of the sealing face S and spaced from the inner peripheral side by the land portions R.

Moreover, a positive pressure generation mechanism 13 including a positive pressure generation groove 13*a* which is communicated with a downstream side in the circumferential direction of the fluid introduction groove 12 and is shallower than the fluid introduction groove 12 is provided. The positive pressure generation mechanism 13 is intended to generate positive pressure (dynamic pressure), thereby increasing a fluid film between the sealing faces and thus increasing lubrication performance.

The positive pressure generation groove 13*a* is communicated with the fluid introduction groove 12 at the upstream side and separated from the outer peripheral side by the land portions R.

In this embodiment, the positive pressure generation mechanism. 13 is formed from a Rayleigh step mechanism including the positive pressure generation groove 13*a* communicating with the fluid introduction groove 12 at the upstream side and a Rayleigh step 13*b*, but is not limited to this, and it is only essential that it be a mechanism to generate positive pressure.

In FIG. 5A, the planar shape formed by the fluid introduction groove 12 and the positive pressure generation mechanism 13 forms a substantially L shape.

Here, if the rotating-side seal ring 4 rotates in a counterclockwise direction, the liquid on the outer peripheral side is introduced into the sealing face from the substantially rectangular fluid introduction groove 12, and it is possible to lubricate the sealing face S. At that time, since positive pressure (dynamic pressure) is generated by the positive pressure generation mechanism 13, a fluid film between the sealing faces is increased, and therefore, lubrication performance can be further increased.

Moreover, since the liquid introduced into the sealing face from the fluid introduction groove 12 in the high speed rotation such as a steady operation of the rotating-side seal ring 4 is discharged by a centrifugal force, the liquid does not leak to the inner peripheral side which is the leakage side.

FIG. 5B is different from FIG. 5A in that the shape of the fluid introduction groove is different, but other respects are the same as those in FIG. 5A.

In FIG. 5B, in the sealing face S of the rotating-side seal ring 4, a fluid introduction groove 14 configured so as to communicate with the sealed fluid side of the sealing face S, that is, the peripheral edge on the outer peripheral side, and not to communicate with the leakage side, that is, the peripheral edge on the inner peripheral side, is provided.

The fluid introduction groove 14 is arranged along the peripheral edge on the outer peripheral side, is formed from a fluid lead-in part 14a and a fluid lead-out part 14b which are communicating only with the peripheral edge on the outer peripheral side of the sealing face S, and a fluid communication part 14c which communicates them in the circumferential direction, and is spaced from the inner peripheral side by the land portions R.

In this embodiment, the fluid lead-in part 14a and the fluid lead-out part 14b are provided with a certain distance in the circumferential direction from each other, and extend linearly in the radial direction respectively, so the planar shape of the fluid introduction groove 14 forms a substantially U shape.

Moreover, the positive pressure generation mechanism 13 including the positive pressure generation groove 13a shallower than the fluid introduction groove 14 is provided in a portion enclosed by the fluid introduction groove 14 and the outer peripheral side. The positive pressure generation mechanism 13 generates positive pressure (dynamic pressure), thereby increasing a fluid film between the sealing faces and thus increasing lubrication performance.

The positive pressure generation groove 13a is communicated with the fluid lead-in part 14a at the upstream side and separated from the fluid lead-out part 14b and the outer peripheral side by the land portions R.

In this embodiment, the positive pressure generation mechanism 13 is formed from a Rayleigh step mechanism including the positive pressure generation groove 13a communicating with the fluid lead-in part 14a of the fluid introduction groove 14 at the upstream side and the Rayleigh step 13b, but is not limited to this, and it is only essential that it be a mechanism to generate positive pressure.

Here, if the rotating-side seal ring 4 rotates in a clockwise direction, the liquid on the outer peripheral side is introduced into the sealing face from the fluid lead-in part 14a of the substantially U-shaped fluid introduction groove 14 and discharged to the outer peripheral side from the fluid lead-out part 14b. At that time, the liquid existing on the outer peripheral side of the sealing face S in the low speed rotation state of the rotating-side seal ring 4 such as at start-up is actively introduced into the sealing face S, and it is possible to lubricate the sealing face S. At that time, since positive pressure (dynamic pressure) is generated by the positive pressure generation mechanism 13, a fluid film between the sealing faces is increased, and therefore, lubrication performance can be further increased.

Moreover, since the liquid introduced into the sealing face from the fluid introduction groove 14 in the high speed rotation such as a steady operation of the rotating-side seal ring 4 is discharged by a centrifugal force, the liquid does not leak to the inner peripheral side which is the leakage side.

In FIG. 5B, the planar shape of the fluid introduction groove 14 is formed into a substantially U shape, but is not limited to this, and it may be formed into a shape in which the fluid lead-in part 14a and the fluid lead-out part 14b converge at the inside diameter side, that is, a substantially V shape.

According to the configuration described above, the second embodiment exhibits the following effects in addition to the effects of the first embodiment.

In the sealing face S of the rotating-side seal ring 4, the fluid introduction groove 12 or 14 configured so as to communicate with the sealed fluid side of the sealing face S, that is, the peripheral edge on the outer peripheral side, and not to communicate with the leakage side, that is, the peripheral edge on the inner peripheral side, is provided, whereby the liquid existing on the outer peripheral side of the sealing face S in the low speed rotation state of the rotating-side seal ring 4 such as at start-up is actively introduced into the sealing face S, and it is possible to lubricate the sealing face S. At that time, since positive pressure (dynamic pressure) is generated by the positive pressure generation mechanism 13, a fluid film between the sealing faces is increased, and therefore, lubrication performance can be further increased.

Moreover, since the liquid introduced into the sealing face from the fluid introduction groove 12 or 14 in the high speed rotation such as a steady operation of the rotating-side seal ring 4 is discharged by a centrifugal force, the liquid does not leak to the inner peripheral side which is the leakage side.

Although the embodiments of the present invention have been described above with reference to the drawings, its specific configuration is not limited to the embodiments. Any changes and additions made without departing from the scope of the present invention are included in the present invention.

For example, although in the above embodiments, an example in which a slide part is used for one of a pair of a rotating seal ring and a stationary seal ring in a mechanical seal device has been described, it may be used as a slide part of a bearing that slides on a rotating shaft while sealing a lubricating oil on one side in an axial direction of a cylindrical sealing face.

Moreover, for example, although in the above embodiments, the outer peripheral side of the slide part has been described as the sealed fluid side (liquid side or mist-like fluid side) and the inner peripheral side of the slide part has been described as the leakage side (gas side), the present invention is not limited to this, and is also applicable to a case where the outer peripheral side is the leakage side (gas side) and the inner peripheral side is the sealed fluid side (liquid side or mist-like fluid side). Moreover, with respect to the magnitude relation between the pressures on the sealed fluid side (liquid side or mist-like fluid side) and the leakage side (gas side), for example, the pressure on the sealed fluid side (liquid side or mist-like fluid side) may be high and the pressure on the leakage side (gas side) may be low, or vice versa, and both pressures may be the same.

Moreover, for example, although in the above embodiments, a case where the dynamic pressure generation groove 10 is a spiral groove has been described, it is not limited to this, it may be a combination of a Rayleigh step and a reverse Rayleigh step, and it is only essential that it be a mechanism to suck the fluid on the leakage side to generate dynamic pressure (positive pressure).

Moreover, for example, although in the above embodiments, a case where the cross-sectional shape of the fluid introduction groove 11 presents a wavy shape has been described, it is not limited to this, and it may be such a shape that curvature smoothly changes, such as an arc shape, for example.

REFERENCE SIGN LIST 1 impeller
2 rotating shaft
3 sleeve
4 rotating-side seal ring
5 housing
6 cartridge
7 rotating-side seal ring
8 coiled wave spring
10 dynamic pressure generation groove
10a end on a leakage side
10b end on a sealed fluid side
11 fluid introduction groove
11a end on a leakage side
11b end on a dynamic pressure generation groove side
12 fluid introduction groove
13 positive pressure generation groove
14 fluid introduction groove
S sealing face
R land portion

The invention claimed is:

1. A slide component comprising a pair of slide parts relatively sliding on each other, wherein
one slide part is a stationary-side seal ring and the other slide part is a rotating-side seal ring, these seal rings have sealing faces formed radially for sealing a sealed fluid from leaking,
in the sealing face of one of the pair of slide parts, a dynamic pressure generation groove is provided, wherein a land portion is provided on each of an inner-diameter side and an outer-diameter side of the dynamic pressure generation groove,
the sealing face of the other of the pair of the slide parts has, in a radial direction, (i) an inner diameter which is set smaller than an inner diameter of the dynamic pressure generation groove, and (ii) an outer diameter which is set larger than an outer diameter of the dynamic pressure generation groove,
the sealing face of the other of the pair of the slide parts is slidably in contact with the land portion on each of the inner-diameter side and the outer-diameter side of the dynamic pressure generation groove of the one of the pair of the slide parts, in a manner that the dynamic pressure generation groove is separated from a sealed fluid side without fluid communication with the sealed fluid side and is separated from a leakage side without direct fluid communication with the leakage side, and
between an end on the leakage side of the dynamic pressure generation groove and the leakage side, a fluid introduction groove which fluidly communicates the dynamic pressure generation groove and the leakage side is provided, wherein a circumferentially cross-sectional area of the fluid introduction groove is set smaller than a circumferentially cross-sectional area of the dynamic pressure generation groove,
wherein the fluid introduction groove is set such that the cross-sectional area thereof decreases from the leakage side toward the dynamic pressure generation groove side.

2. A slide component comprising a pair of slide parts relatively sliding on each other, wherein
one slide part is a stationary-side seal ring and the other slide part is a rotating-side seal ring, these seal rings have sealing faces formed radially for sealing a sealed fluid from leaking,
in the sealing face of one of the pair of slide parts, a dynamic pressure generation groove is provided, wherein a land portion is provided on each of an inner-diameter side and an outer-diameter side of the dynamic pressure generation groove,
the sealing face of the other of the pair of the slide parts has, in a radial direction, (i) an inner diameter which is set smaller than an inner diameter of the dynamic pressure generation groove, and (ii) an outer diameter which is set larger than an outer diameter of the dynamic pressure generation groove,
the sealing face of the other of the pair of the slide parts is slidably in contact with the land portion on each of the inner-diameter side and the outer-diameter side of the dynamic pressure generation groove of the one of the pair of the slide parts, in a manner that the dynamic pressure generation groove is separated from a sealed fluid side without fluid communication with the sealed fluid side and is separated from a leakage side without direct fluid communication with the leakage side, and
between an end on the leakage side of the dynamic pressure generation groove and the leakage side, a fluid introduction groove which fluidly communicates the dynamic pressure generation groove and the leakage side is provided, wherein a circumferentially cross-sectional area of the fluid introduction groove is set smaller than a circumferentially cross-sectional area of the dynamic pressure generation groove,
wherein the fluid introduction groove is arranged to be inclined upstream from the leakage side toward the dynamic pressure generation groove side.

3. A slide component comprising a pair of slide parts relatively sliding on each other, wherein
one slide part is a stationary-side seal ring and the other slide part is a rotating-side seal ring, these seal rings have sealing faces formed radially for sealing a sealed fluid from leaking,
in the sealing face of one of the pair of slide parts, a dynamic pressure generation groove is provided, wherein a land portion is provided on each of an inner-diameter side and an outer-diameter side of the dynamic pressure generation groove,
the sealing face of the other of the pair of the slide parts has, in a radial direction, (i) an inner diameter which is set smaller than an inner diameter of the dynamic pressure generation groove, and (ii) an outer diameter which is set larger than an outer diameter of the dynamic pressure generation groove,
the sealing face of the other of the pair of the slide parts is slidably in contact with the land portion on each of the inner-diameter side and the outer-diameter side of the dynamic pressure generation groove of the one of the pair of the slide parts, in a manner that the dynamic pressure generation groove is separated from a sealed fluid side without fluid communication with the sealed fluid side and is separated from a leakage side without direct fluid communication with the leakage side, and
between an end on the leakage side of the dynamic pressure generation groove and the leakage side, a fluid introduction groove which fluidly communicates the dynamic pressure generation groove and the leakage side is provided, wherein a circumferentially cross-sectional area of the fluid introduction groove is set smaller than a circumferentially cross-sectional area of the dynamic pressure generation groove, wherein, the fluid introduction groove has a cross-sectional shape, which presents wavy smooth curves at a bottom wall and side walls of the fluid introduction groove.

4. The slide component according to claim 1, wherein, in the sealing face of at least one slide part of the pair of slide parts, a fluid introduction groove configured so as to communicate with the sealed fluid side and not to communicate with the leakage side is provided.

5. The slide component according to claim 1, wherein the dynamic pressure generation groove has a spiral shape for sucking the fluid on the leakage side and pumping it to the sealed fluid side.

6. The slide component according to claim 1, wherein, in the sealing face of at least one slide part of the pair of slide parts, a fluid introduction groove configured so as to communicate with the sealed fluid side and not to communicate with the leakage side is provided.

7. The slide component according to claim 1, wherein, in the sealing face of at least one slide part of the pair of slide parts, a fluid introduction groove configured so as to communicate with the sealed fluid side and not to communicate with the leakage side is provided.

8. The slide component according to claim 2, wherein, in the sealing face of at least one slide part of the pair of slide parts, a fluid introduction groove configured so as to communicate with the sealed fluid side and not to communicate with the leakage side is provided.

9. The slide component according to claim 3, wherein, in the sealing face of at least one slide part of the pair of slide parts, a fluid introduction groove configured so as to communicate with the sealed fluid side and not to communicate with the leakage side is provided.

10. The slide component according to claim 2, wherein the dynamic pressure generation groove has a spiral shape for sucking the fluid on the leakage side and pumping it to the sealed fluid side.

11. The slide component according to claim 3, wherein the dynamic pressure generation groove has a spiral shape for sucking the fluid on the leakage side and pumping it to the sealed fluid side.

12. The slide component according to claim 2, wherein, in the sealing face of at least one slide part of the pair of slide parts, a fluid introduction groove configured so as to communicate with the sealed fluid side and not to communicate with the leakage side is provided.

13. The slide component according to claim 3, wherein, in the sealing face of at least one slide part of the pair of slide parts, a fluid introduction groove configured so as to communicate with the sealed fluid side and not to communicate with the leakage side is provided.

14. The slide component according to claim 2, wherein, in the sealing face of at least one slide part of the pair of slide parts, a fluid introduction groove configured so as to communicate with the sealed fluid side and not to communicate with the leakage side is provided.

15. The slide component according to claim 3, wherein, in the sealing face of at least one slide part of the pair of slide parts, a fluid introduction groove configured so as to communicate with the sealed fluid side and not to communicate with the leakage side is provided.

16. The slide component according to claim 1, wherein the sealed fluid is a liquid or a mist-like fluid.

17. The slide component according to claim 2, wherein the sealed fluid is a liquid or a mist-like fluid.

18. The slide component according to claim 3, wherein the sealed fluid is a liquid or a mist-like fluid.

19. The slide component according to claim 1, wherein the dynamic pressure generation groove has a spiral shape for sucking the fluid on the leakage side and pumping it to the sealed fluid side.

20. The slide component according to claim 2, wherein the dynamic pressure generation groove has a spiral shape for sucking the fluid on the leakage side and pumping it to the sealed fluid side.

* * * * *